United States Patent Office 3,700,636
Patented Oct. 24, 1972

3,700,636
2-METHYL-5-VINYLTETRAZOLE: ACRYLIC ESTER: ACRYLIC ACID POLYMERS
Hermann S. Haiss, Indian Head, and James U. Lowe, Jr., Landover, Md., assignors to the United States of America as represented by the Secretary of the Navy
No Drawing. Filed Dec. 26, 1967, Ser. No. 694,031
Int. Cl. C08f 17/00
U.S. Cl. 260—80.72        3 Claims

ABSTRACT OF THE DISCLOSURE

A terpolymer of 2-methyl-5-vinyltetrazole/acrylic ester/acrylic acid and a method of preparing it by reacting 2-methyl-5-vinyl tetrazole acrylic acid and an acrylate in the presence of a chain transfer agent. The resulting composition provides a new fuel binder composition for propellant formulations and also a new gumstock composition.

BACKGROUND OF THE INVENTION

This invention relates to a novel terpolymer and its method of preparation. The invention also includes the use of the terpolymer in a fuel binder composition for propellant formulations and in a gumstock composition.

Prior to the invention, vinyl tetrazole and its substitution products were used as binders for composite propellants and explosives of various types since they contained large percentages of nitrogen which increases the burning rate. However, these materials exhibited poor mechanical properties such as low elongation and low tensile strength and in addition the tetrazoles contained very poor temperature stability as evidenced by derivatives such as 2-methyl-5-dimethyl-aminotetrazole and 2-methyl-5-cyanotetrazole which cook off at temperatures as low as 70° C. Copolymers such as poly-2-methyl-5-vinyltetrole-acrylic acid were investigated but they were found to be solid brittle materials which could be successfully formulated only with 40–60% plasticizer.

SUMMARY OF THE INVENTION

Accordingly, it is an object of the invention to provide a binder which is rich in nitrogen but resistant to high temperatures.

Another object is to provide a binder which exhibits good mechanical properties.

Still another object of the invention is to provide a method for preparing such a binder.

Briefly, in accordance with one embodiment of this invention these and other objects are obtained by the terpolymer of 2-methyl-5-vinyltetrazole:acrylic ester: acrylic acid which may be prepared by reacting 2-methyl-5-vinyltetrazole, acrylic acid and an acrylate in the presence of a chain transfer agent.

DESCRIPTION OF THE PREFERRED EMBODIMENTS

The following examples serve to illustrate how the present invention may be carried out in practice; however, the invention is not limited to these examples.

Example I.—2-methyl-5-vinyltetrazole:ethyl acrylate:acrylic acid

In a three-necked flask fitted with reflux condenser and mechanical stirrer, a solution of the monomers, i.e. 2-methylvinyl-5-tetrazole (MVT), acrylic acid (AA) and ethyl acrylate (EA) and a chain transfer agent such as 2-mercaptoethanol (ME) in dimethylformamide (DMF) is heated under a blanket of nitrogen. After this solution is brought up to the desired reaction temperature, azo-1,3-bis (isobutyronitrile) (AIBN), an initiator, is added in DMF and the heating is continued for two hours. After the bulk of the solvent is removed at 15 mm. and 90° C., the residue is heated an additional 24 hours at 0.5 mm. and 90° C. to remove residual solvent and unreacted monomers.

This polymerization reaction gives fluid or rubbery materials depending on the reaction conditions. The viscosity can be easily influenced by changing the amounts of solvent, chain transfer agent and initiator or by varying the reaction temperature. The actual concentration of the reactants, the reaction conditions and yield is set forth in Table I.

Terpolymer No. 1 was prepared from 150 millimoles of 2-methyl-5-vinyltetrazole (MVT), 150 millimoles of ethyl acrylate (EA) and 20 millimoles of acrylic acid (AA) in 360 ml. of dimethylformamide (DMF). Terpolymers No. 2–6 were prepared from 450 millimoles of MVT, 450 millimoles of EA and 60 millimoles of AA in 150 ml of DMF.

TABLE I

| No. | Reaction temp. (° C.) | AIBN (wt. percent) | ME (wt. percent) | Yield (percent) | Mol. wt. |
|---|---|---|---|---|---|
| 1 | 80  | 1.2 | 1.30 | 76.0 | 1,980 |
| 2 | 130 | 1.2 | 1.50 | 81.3 | 852 |
| 3 | 140 | 1.2 | 1.50 | 84.5 | 840 |
| 4 | 153 | 1.2 | 1.50 | 83.0 | 825 |
| 5 | 153 | 2.4 | 1.50 | 85.5 | 750 |
| 6 | 153 | 2.4 | 3.75 | 88.0 | 720 |

Example II.—2-methyl-5-vinyltetrazole:butyl acrylate:acrylic acid

Similar conditions were present as in Example I except that butyl acrylate was substituted for ethyl acrylate. These terpolymers, No. 7–11, were prepared from 450 millimoles of MVT, 450 millimoles of BA and 50 millimoles of AA in 150 ml. of DMF.

TABLE II

| No. | Reaction temp. (° C.) | AIBN (wt. percent) | ME (wt. percent) | Yield (percent) | Mol. wt. |
|---|---|---|---|---|---|
| 7  | 110 | 1.2 | 1.5 | 75.7 | 1,601 |
| 8  | 120 | 1.2 | 1.5 | 77.5 | 1,490 |
| 9  | 130 | 1.2 | 1.5 | 71.3 | 1,445 |
| 10 | 153 | 1.2 | 1.5 | 74.9 | 1,360 |
| 11 | 153 | 2.4 | 3.0 | 83.9 | 1,185 |

The composition of the terpolymers prepared generally contained 50–60% 2-methyl-5-vinyltetrazole, 37–47% acrylic ester (ethyl or butyl acrylate) and about 3–5% acrylic acid by weight.

After the terpolymers have been formed they can be cured with a variety of resins to form a gumstock which exhibits good mechanical properties and high temperature resistance up to about 150° C. For example, epoxy resins such as polyphenyl glycidyl ether (Kopox 170) or glycerol and epichlorohydrin (EPON 812) may be used at temperatures between 70° and 90° C. with ferric acetylacetonate (FeAA) as a catalyst. The curing time varies between 2 and 3 days depending on the temperature and the amount of catalyst. Table III shows the properties of four different gumstock systems employing different resins and terpolymers.

TABLE III.—PROPERTIES OF CURED TERPOLYMERS

| Number | Tensile strength at break (p.s.i.) | Elongation at break (percent) | Weight loss at 150° C. (percent) |
|---|---|---|---|
| 1 | 68 | 380 | 3.77 (24 hours).<br>4.70 (48 hours).<br>6.32 (120 hours). |
| 2 | 118 | 240 | 4.81 (24 hours).<br>5.30 (48 hours).<br>6.15 (120 hours). |
| 3 | 40 | 405 | 1.61 (24 hours).<br>3.02 (48 hours).<br>5.05 (120 hours). |
| 4 | 98 | 290 | 1.79 (24 hours).<br>2.50 (48 hours).<br>3.42 (120 hours). |

Composition of cured terpolymers:

No. 1—MVT=EA=AA; mol. wt. 850; resin Epon 812; catalyst: 0.1% FeAA.
No. 2—MVT=EA=AA; mol. wt. 850; resin Kopox 170; catalyst: 0.05% FeAA.
No. 3—MVT=BA=AA; mol. wt. 1,490; resin Epon 812; catalyst: 0.25% FeAA.
No. 4—MVT=BA=AA; mol. wt. 1,490; resin Kopox 170; catalyst: 0.1% FeAA.

The terpolymers may also be used in propellant formulations to good advantage since they are compatible with a wide variety of oxidizers such as potassium, ammonium, hydroxyammonium and 5-aminotetrazole perchlorates in addition to ammonium and 5-amino tetrazole nitrates. In this way, the terpolymers can be directly mixed with oxidizers without previous plasticization. The terpolymers further improve the stability of the actual propellant, for example, 1,3,5-trinitro-1,3,5-triazocyclohexane (RDX) and 1,3,5,7-tetranitro-1,3,5,7-tetrazacycloodane.

The invention may also be performed with a mixture of the 1- and 2-isomers of methyl-5-vinyltetrazole instead of the 2-isomer. The advantage of using the mixture is a saving in cost because the current synthesis for the 2-isomer yields both isomers which necessitates a separation step if only one isomer is desired. In addition other acrylates such as methyl or propyl are included within the scope of the invention.

Obviously many modifications and variations of the invention are possible in light of the above teachings. It is therefore to be understood that the invention may be practiced other than specifically described.

Having thus described he invention, what is claimed as new and desired to be secured by Letters Patent of the United States is:

1. A terpolymer of 2-methyl-5-vinyltetrazole:acrylic ester: acrylic acid.
2. A terpolymer which consists of 50–60% by weight of 2-methyl-5-vinyltetrazole, 37–47% by weight acrylic esters and 3–5% by weight of acrylic acid.
3. A terpolymer of claim 2 wherein the acrylic ester is taken from the group consisting of ethyl acrylate and butyl acrylate.

References Cited

Katritzky et al.: Advances in Heterocyclic Chemistry vol. 7, Academic Press, New York, 1966, p. 261.

LELAND A. SEBASTIAN, Primary Examiner

U.S. Cl. X.R.

149—19, 92; 260—836